United States Patent
Huang et al.

(10) Patent No.: US 11,587,743 B2
(45) Date of Patent: Feb. 21, 2023

(54) BACKLIGHT APPARATUS USED IN ILLUMINATED KEYBOARD THAT INCLUDES TRANSLUCENT GLUE BODIES

(71) Applicant: DARFON ELECTRONICS CORP., Taoyuan (TW)

(72) Inventors: Heng-Yi Huang, Taoyuan (TW); Hsin-Cheng Ho, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 17/510,597

(22) Filed: Oct. 26, 2021

(65) Prior Publication Data

US 2022/0139648 A1    May 5, 2022

(30) Foreign Application Priority Data

Nov. 3, 2020    (TW) .................................. 109138281

(51) Int. Cl.
| | |
|---|---|
| *H01H 13/702* | (2006.01) |
| *G06F 1/16* | (2006.01) |
| *H01H 13/83* | (2006.01) |
| *G06F 3/02* | (2006.01) |

(52) U.S. Cl.
CPC ......... *H01H 13/702* (2013.01); *G06F 1/1662* (2013.01); *G06F 3/021* (2013.01); *H01H 13/83* (2013.01); *H01H 2215/008* (2013.01); *H01H 2219/04* (2013.01)

(58) Field of Classification Search
None
See application file for complete search history.

(56) References Cited

U.S. PATENT DOCUMENTS

| | | | | |
|---|---|---|---|---|
| 2013/0271948 A1* | 10/2013 | Chang | ..................... | H01H 13/83 |
| | | | | 362/23.03 |
| 2016/0109636 A1* | 4/2016 | Weng | ..................... | H01H 13/83 |
| | | | | 362/23.03 |
| 2020/0301523 A1* | 9/2020 | Ho | ....................... | G06F 3/04886 |
| 2020/0301524 A1* | 9/2020 | Ho | ....................... | G06F 3/04886 |

FOREIGN PATENT DOCUMENTS

| | | | |
|---|---|---|---|
| CN | 202871650 U | * | 4/2013 |
| CN | 105304388 A | * | 2/2016 |
| TW | 201712379 A | * | 4/2017 |

* cited by examiner

*Primary Examiner* — Kirk W Hermann
(74) *Attorney, Agent, or Firm* — Muncy, Geissler, Olds & Lowe, P.C.

(57) ABSTRACT

A backlight apparatus includes a light-guiding plate, a light-shielding membrane, a light-reflecting sheet, a plurality of first translucent glue bodies, and a plurality of second translucent glue bodies. The light-guiding plate has a plurality of through holes. Each of the first translucent glue bodies corresponds to one of the through holes. Each first translucent glue body is placed on a front surface of the light-guiding plate, and surrounds a respective circumference of the corresponding through hole to bond the light-shielding membrane thereabove and the light-guiding plate therebelow. Each first translucent glue body has a respective breach. Each of the second translucent glue bodies corresponds to one of the first translucent glue bodies, is placed via at least one portion thereof in the breach of the corresponding first translucent glue body, and bonds the light-shielding membrane thereabove and the light-guiding plate therebelow.

6 Claims, 7 Drawing Sheets

BACKLIGHT APPARATUS USED IN ILLUMINATED KEYBOARD THAT INCLUDES TRANSLUCENT GLUE BODIES

CROSS-REFERENCE TO RELATED APPLICATION

This utility application claims priority to Taiwan Application Serial Number 109138281, filed Nov. 3, 2020, which is incorporated herein by reference.

BACKGROUND OF THE INVENTION

1. Field of the Invention

The invention relates to a backlight apparatus used in an illuminated keyboard, and in particular, to a backlight apparatus used in an illuminated keyboard, which bonds a light-shielding membrane, a light-guiding plate and a light-reflecting sheet thereof with glue bodies, and which has low light attenuation and does not cause light leakage from light-emitting devices thereof.

2. Description of the Prior Art

Illuminated keyboards have become common input peripheral devices on the market. Most of the current luminous keyboards use backlight apparatuses.

Figure 1:
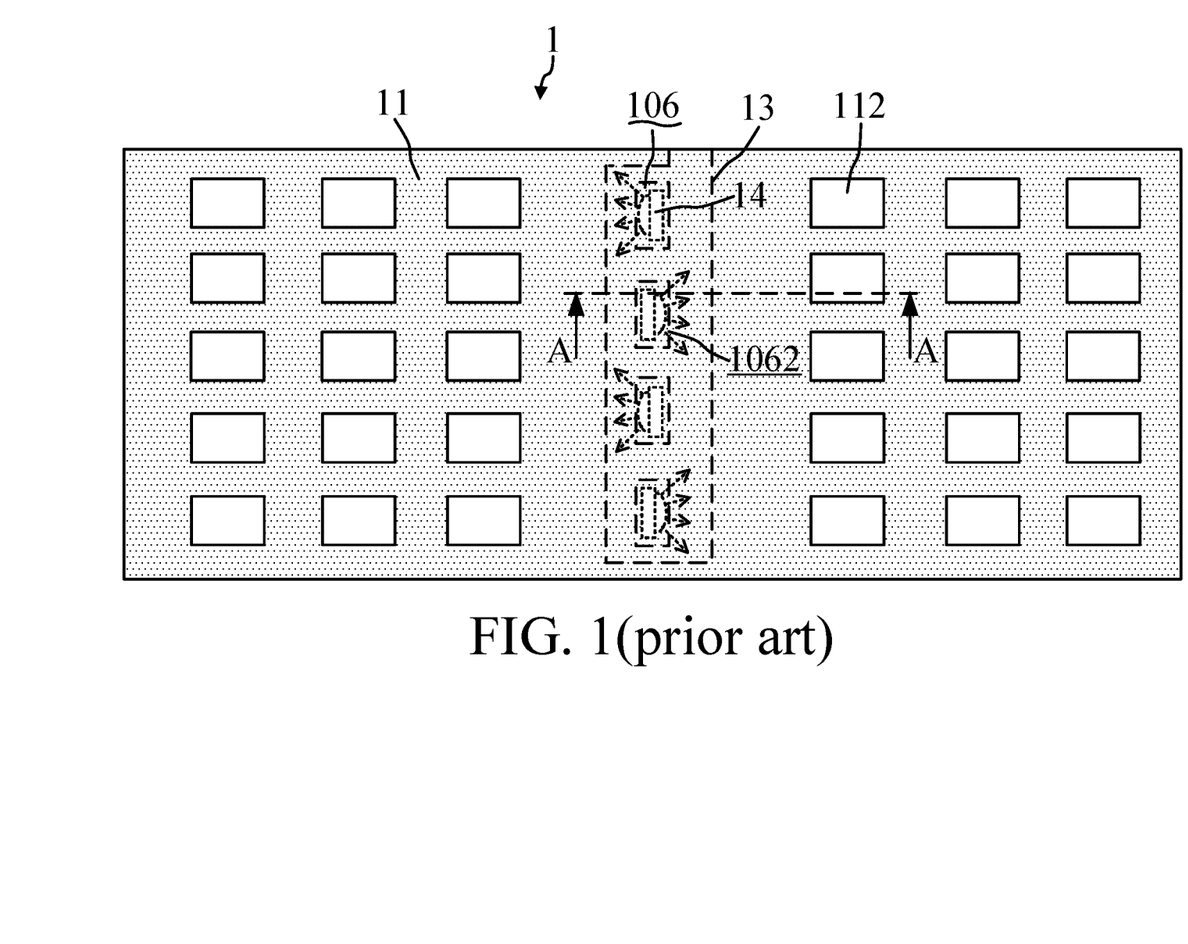
FIG. 1 is a top view of a backlight apparatus used in an illuminated keyboard according to a prior art.
Figure 2:
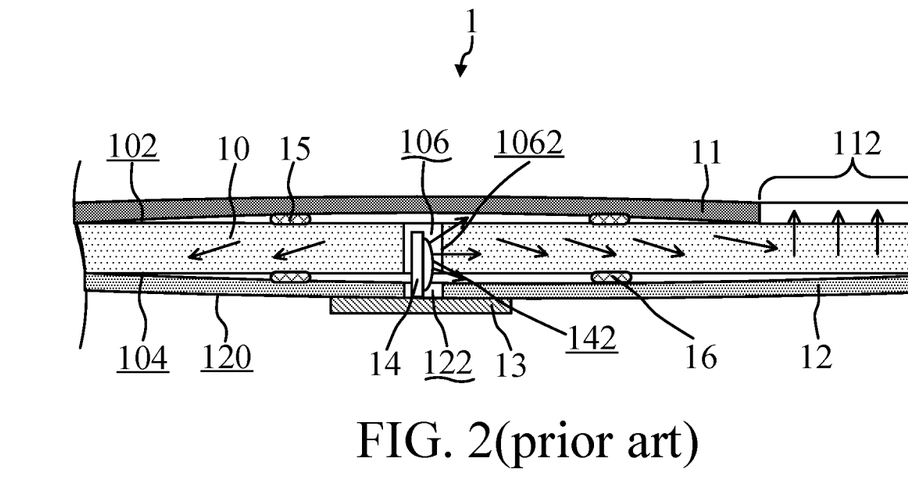
FIG. 2 is a partial cross-sectional view of the backlight apparatus in FIG. 1 along the line A-A.

Referring to FIG. 1 and FIG. 2, FIG. 1 is a top view of backlight apparatus 1 of a prior art, which is used in an illuminated keyboard. FIG. 2 is a partial cross-sectional view of the backlight apparatus 1 of the prior art in FIG. 1 along the line A-A.

As shown in FIG. 1 and FIG. 2, the backlight apparatus 1 of the prior art includes a light-guiding plate 10, a light-shielding membrane 11, a light-reflecting sheet, a circuit board 13, a plurality of light-emitting devices 14, a plurality of first translucent glue bodies 15, and a plurality of second translucent glue bodies 16.

The light-guiding plate 10 has a front surface 102, a back surface 104 and a plurality of first through holes 106. Each first through hole 106 has a respective light entrance face 1062. The light-shielding membrane 11 has a plurality of light-transmitting parts 112 thereon. The light-shielding membrane 11 is disposed on the front surface 102 of the light-guiding plate 10. The light-reflecting sheet 12 has a plurality of second through holes 122 and a lower surface 120. Each second through hole 122 corresponds to one of the first through holes 106. The light-reflecting sheet 12 is disposed on the back surface 104 of the light-guiding plate 10 such that each second through hole 122 is aligned with the corresponding first through hole 106.

The plurality of light-emitting devices 14 are generally light-emitting diodes, and all are electrically bonded on the circuit board 13. Each light-emitting device 14 has a respective light-emitting side face 142, and corresponds to one of the first through holes 106 and one of the second through holes 122. The circuit board 13 is disposed on the lower surface 120 of the reflector such that each light-emitting device 14 is placed in the corresponding second through hole 122 and the corresponding first through hole 106, and that the light-emitting side face 142 of each light-emitting device 14 faces the light entrance face 1062 of the corresponding first through hole 106. In FIG. 1, the circuit board 13, the plurality of light-emitting devices 14 and the plurality of first through holes 106 of the light guide plate 10 under the light-shielding membrane 11 are drawn with dashed lines to show the positional relationship among one another.

As shown FIG. 2, a plurality of first translucent glue bodies 15 are formed between the light-shielding membrane 11 and the light-guiding plate 10 by dispensing so as to bond the light-shielding membrane 11 and the light-guiding plate 10 together. It should be noted that the plurality of first translucent glue bodies 15 are far away from the plurality of first through holes 106. Therefore, there are gaps between the light-shielding membrane 11 and the light-guiding plate 10 in the areas adjacent to the first through holes 106.

A plurality of second translucent glue bodies 16 are also formed between the light-guiding plate 10 and the light-reflecting sheet 12 by dispensing, so as to bond the light-guiding plate 10 and the light-reflecting sheet 12 together. It should also be noted that the plurality of second translucent glue bodies 16 are far away from the plurality of first through holes 106. Therefore, there are gaps between the light-guiding plate 10 and the light-reflecting sheet 12 in the areas adjacent to the first through holes 106.

Each light-emitting device 14 emits light from the light-emitting side face 142 thereof toward the light entrance face 1062 of the corresponding first through hole 106, and then enters the light-guiding plate 10. The light is guided by the light-guiding plate 10, and exits from the plurality of light-transmitting parts 112 of the light-shielding membrane 11. The light-reflecting sheet 12 is used to reflect the light directed to the light-reflecting sheet 12.

However, the gaps between the light-shielding membrane 11 and the light guide plate 10 and the gaps between the light-guiding plate 10 and the light-reflecting sheet 12 cause the light emitted to the light-guiding plate 10 to leak significantly.

Figure 3:
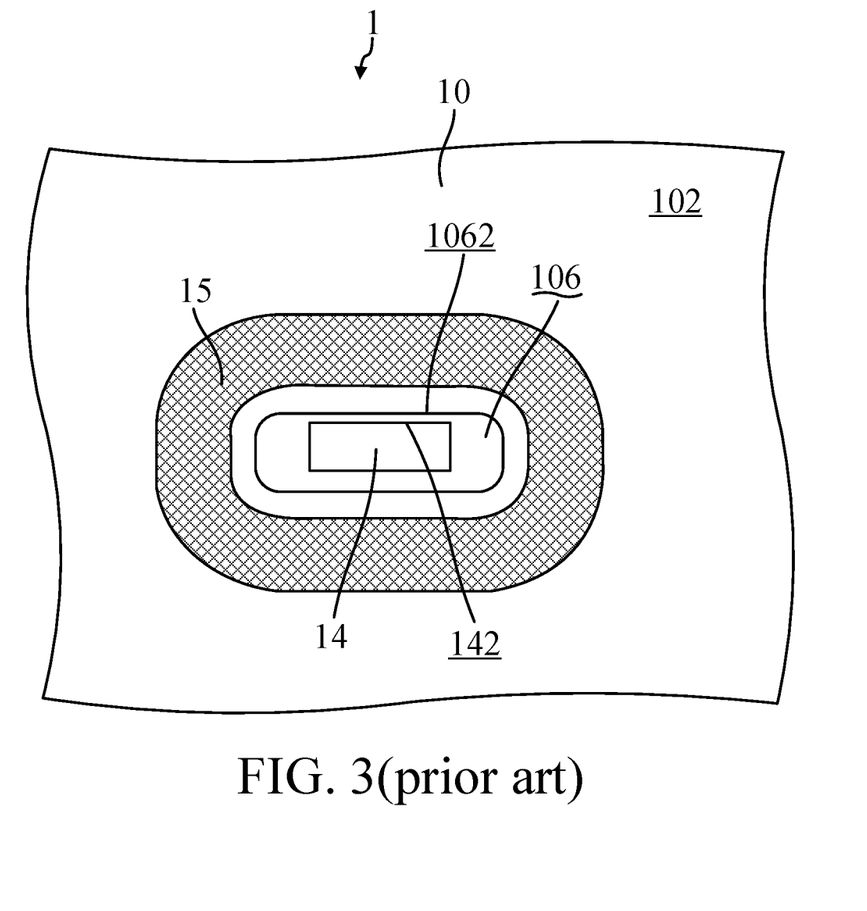
FIG. 3 is a partial top view of a backlight apparatus of another prior art with the uppermost light-shielding membrane removed.

Referring to FIG. 3, FIG. 3 is a partial top view of backlight apparatus 1 of another prior art. Similar to the backlight apparatus 1 shown in FIG. 1 and FIG. 2, and referring to FIG. 1 and FIG. 2 again, the backlight apparatus 1 of another prior art also includes a light-guiding plate 10, a light-shielding membrane 11 (also as shown in FIG. 1 and FIG. 2), a light-reflecting sheet 12 (also as shown in FIG. 2), a circuit board 13 (also as shown in FIG. 2), a plurality of light-emitting devices 14, and a plurality of first translucent glue bodies 15 (also as shown in FIG. 2) and a plurality of second translucent glue bodies 16 (also as shown in FIG. 2). The architecture of the backlight apparatus 1 of another prior art is also substantially similar to that of the backlight apparatus 1 shown in FIG. 1 and FIG. 2. In FIG. 3, the uppermost light-shielding membrane 11 is removed to expose the light-guiding plate 10, one of the first through holes 106 of the light-guiding plate 10, one of the light-emitting devices 142, and so on.

The backlight apparatus 1 of another prior art also uses a plurality of first translucent glue bodies 15 to bond the light-shielding membrane 11 and the light-guiding plate 10 together, and also uses a plurality of second translucent glue bodies 16 to bond the light-guiding plate 10 and the light-reflecting sheet 12 together. Each first translucent glue body 15 corresponds to one of the first through holes 106 of the light-guiding plate 10. Each first translucent glue body 15 is formed between the light-shielding membrane 11 and the light guide plate 10. Different from the backlight apparatus 1 as shown in FIG. 1 and FIG. 2, in the backlight apparatus 1 as shown in FIG. 3, each first translucent glue body 15 surrounds the corresponding first through hole 106. Therefore, there is no gap between the light-shielding membrane 11 and the light-guiding plate 10 in the area adjacent to the first through holes 106. Similarly, each second translucent glue body 16 corresponds to one of the first through holes 106 of the light-guiding plate 10. Each second translucent glue body 16 is formed between the light-guiding plate 10 and the light-reflecting sheet 12, and surrounds the corresponding first through hole 106 (not shown in FIG. 3). Therefore, there is no gap between the light-guiding plate 10 and the light-reflecting sheet 12 in the area adjacent to the first through holes 106. In this way, the light emitted to the light-guiding plate 10 will not leak. However, the first translucent glue bodies 15 and the second translucent glue bodies 16 essentially absorb light. The first translucent glue bodies 15 and the second translucent glue bodies 16 surrounding the first through holes 106 also surround the light-emitting devices 14. Therefore, the first translucent glue bodies 15 and the second translucent glue bodies 16 absorb a portion of the light emitted from the light-emitting side faces 142 of the light-emitting devices 14 and traveling forward. Due to the partial absorption by the first translucent glue bodies 15 and the second translucent glue bodies 16, there will be obvious light attenuation, which will result in dark areas in the backlight apparatus 1 far away from the light-emitting devices 14.

SUMMARY OF THE INVENTION

Accordingly, one scope of the invention is to provide a backlight apparatus used in an illuminated keyboard, whose light-shielding membrane, light-guiding plate and light-reflecting sheet are bonded with glue bodies. Moreover, the backlight apparatus according to the invention has low light attenuation and does not cause light leakage of light-emitting devices thereof.

A backlight apparatus according to a preferred embodiment of the invention is used in an illuminated keyboard. The backlight apparatus according to the invention includes a light-guiding plate, a light-shielding membrane, a light-reflecting sheet, a circuit board, a plurality of light-emitting devices, and a plurality of first translucent glue bodies. The light-guiding plate has a front surface, a back surface and a plurality of first through holes. Each first through hole has a respective light entrance face. The light-shielding membrane has a plurality of light-transmitting parts thereon. The light-shielding membrane is disposed on the front surface of the light-guiding plate. The light-reflecting sheet has a plurality of second through holes and a lower surface. Each second through hole corresponds to one of the first through holes. The light-reflecting sheet is on the back surface of the light-guiding plate such that each second through hole is aligned with the corresponding first through hole. The plurality of light-emitting devices are electrically bonded on the circuit board. Each light-emitting device has a light-emitting side face, and corresponds to one of the first through holes and one of the second through holes. The circuit board is disposed on the lower surface of the light-reflecting sheet such that each light-emitting device is placed in the corresponding second through hole and the corresponding first through hole, and that the light-emitting side face of each light-emitting device faces the light entrance face of the corresponding first through hole. Each of the first translucent glue bodies corresponds to one of the first through holes. Each first translucent glue body is placed on the front surface of the light-guiding plate and surrounds a respective first circumference of the corresponding first through hole to bond the light-shielding membrane thereabove and the light-guiding plate therebelow. Each first translucent glue body has a respective first breach. Each light-emitting device emits a light from the light-emitting side face thereof toward the corresponding first translucent glue body, the corresponding first breach, and the light entrance face of the corresponding first through hole, and further enters the light-guiding plate. The light is guided by the light-guiding plate, and exits from the plurality of light-transmitting parts. The light-reflecting sheet is used for reflecting the light directed to the light-reflecting sheet.

Further, the backlight apparatus according to the invention also includes a plurality of second translucent glue bodies. Each of the second translucent glue bodies corresponding to one of the first translucent glue bodies. Each second translucent glue body is placed via at least one portion thereof in the first breach of the corresponding first translucent glue body, and bonds the light-shielding membrane thereabove and the light-guiding plate therebelow. Each second translucent glue body and the corresponding first translucent glue body form a respective first slit and a respective second slit. Each light-emitting device emits the light from the light-emitting side face thereof also toward the corresponding second translucent glue body, the corresponding first slit and the corresponding second slit.

In one embodiment, the each light-emitting device also has a respective first side edge and a respective second side edge adjacent to the light-emitting side face. Each first translucent glue body also has a respective first breach edge and a respective second breach edge. The first breach edge of each first translucent glue body corresponds the first side edge of the corresponding light-emitting device. The second breach edge of each first translucent glue body corresponds to the second side edge of the corresponding light-emitting device. A first perpendicular distance between the first side edge of each light-emitting device and the corresponding first breach edge ranges from 0.15 mm to 0.25 mm. A second perpendicular distance between the second side edge of each light-emitting device and the corresponding second breach edge ranges from 0.15 mm to 0.25 mm.

In one embodiment, each second translucent glue body has a respective first face away from the corresponding light-emitting device. A first width of the first face of each second translucent glue body ranges from 1.5 mm to 2.5 mm.

In one embodiment, a respective first top surface of each second translucent glue body can exhibit a rectangle, a triangle, a trapezoid, a polygon with more than four sides, a circle, an ellipse, etc.

In one embodiment, a first protruding distance of the first face of each second translucent glue body beyond the corresponding first breach ranges from 0.5 mm to 1.5 mm.

Further, the backlight apparatus according to the invention also includes a plurality of third translucent glue bodies and a plurality of fourth translucent glue bodies. Each of the third translucent glue bodies corresponds to one of the first through hole. Each third translucent glue body is placed on the back surface of the light-guiding plate and surrounds a respective second circumference of the corresponding first through hole to bond the light-guiding plate thereabove and the light-reflecting sheet therebelow. Each third translucent glue body has a respective second breach. Each of the fourth translucent glue bodies corresponds to one of the third translucent glue bodies. Each fourth translucent glue body is placed via at least one portion thereof in the second breach of the corresponding third translucent glue body, and bonds the light-guiding plate thereabove and the light-reflecting sheet therebelow. Each fourth translucent glue body and the corresponding third translucent glue body form a respective third slit and a respective fourth slit. Each light-emitting device emits the light from the light-emitting side face thereof also toward the corresponding third translucent glue body, the corresponding fourth translucent glue body, the corresponding third slit and the corresponding fourth slit.

In one embodiment, each third translucent glue body also has a respective third breach edge and a respective fourth breach edge. The third breach edge of each third translucent glue body corresponds the first side edge of the corresponding light-emitting device. The fourth breach edge of each third translucent glue body corresponds to the second side edge of the corresponding light-emitting device. A third perpendicular distance between the first side edge of each light-emitting device and the corresponding third breach edge ranges from 0.15 mm to 0.25 mm. A fourth perpendicular distance between the second side edge of each light-emitting device and the corresponding fourth breach edge ranges from 0.15 mm to 0.25 mm.

In one embodiment, each fourth translucent glue body has a respective second face away from the corresponding light-emitting device. A second width of the second face of each fourth translucent glue body ranges from 1.5 mm to 2.5 mm.

In one embodiment, a respective second top surface of each fourth translucent glue body can exhibit a rectangle, a triangle, a trapezoid, a polygon with more than four sides, a circle, an ellipse, etc.

In one embodiment, a second protruding distance of the second face of each fourth translucent glue body beyond the corresponding second breach ranges from 0.5 mm to 1.5 mm.

Compared to the prior art, the backlight apparatus used in illuminated keyboard according to the invention also uses glue bodies to bond the light-shielding membrane, the light-guiding plate and the light-reflecting sheet, but has low light attenuation and does not cause light leakage of light-emitting devices thereof.

The advantage and spirit of the invention may be understood by the following recitations together with the appended drawings.

DETAILED DESCRIPTION OF THE INVENTION

Some preferred embodiments and practical applications of this present invention would be explained in the following paragraph, describing the characteristics, spirit, and advantages of the invention.

Figure 4:
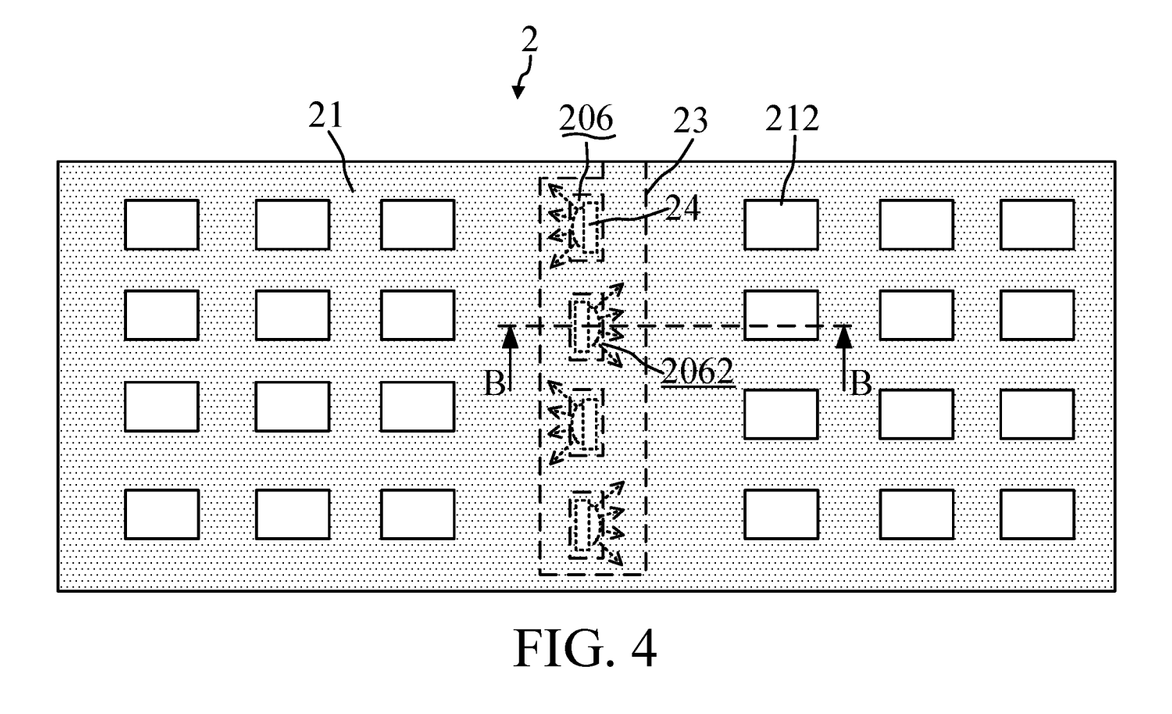
FIG. 4 is a top view of a backlight apparatus used in an illuminated keyboard according to the preferred embodiment of the invention.
Figure 5:
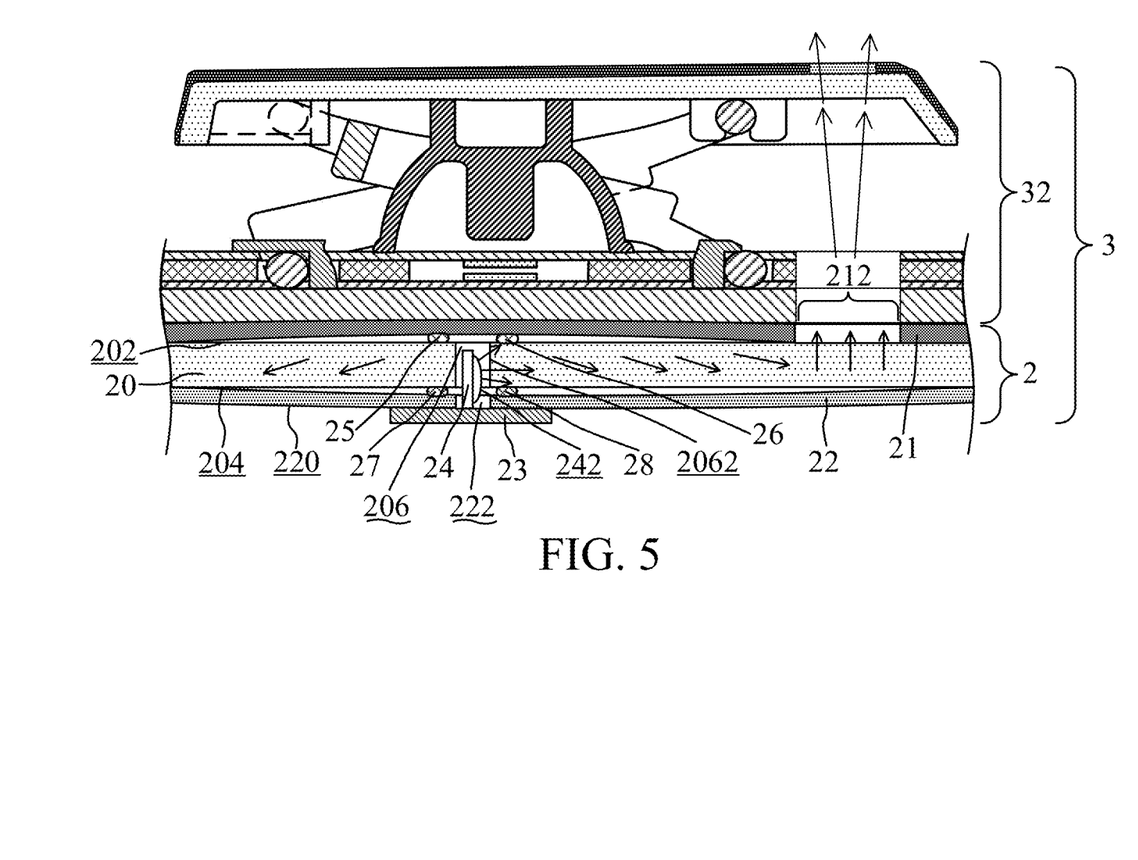
FIG. 5 is a partial cross-sectional view of the backlight apparatus in FIG. 4 along the line B-B.
Figure 6:
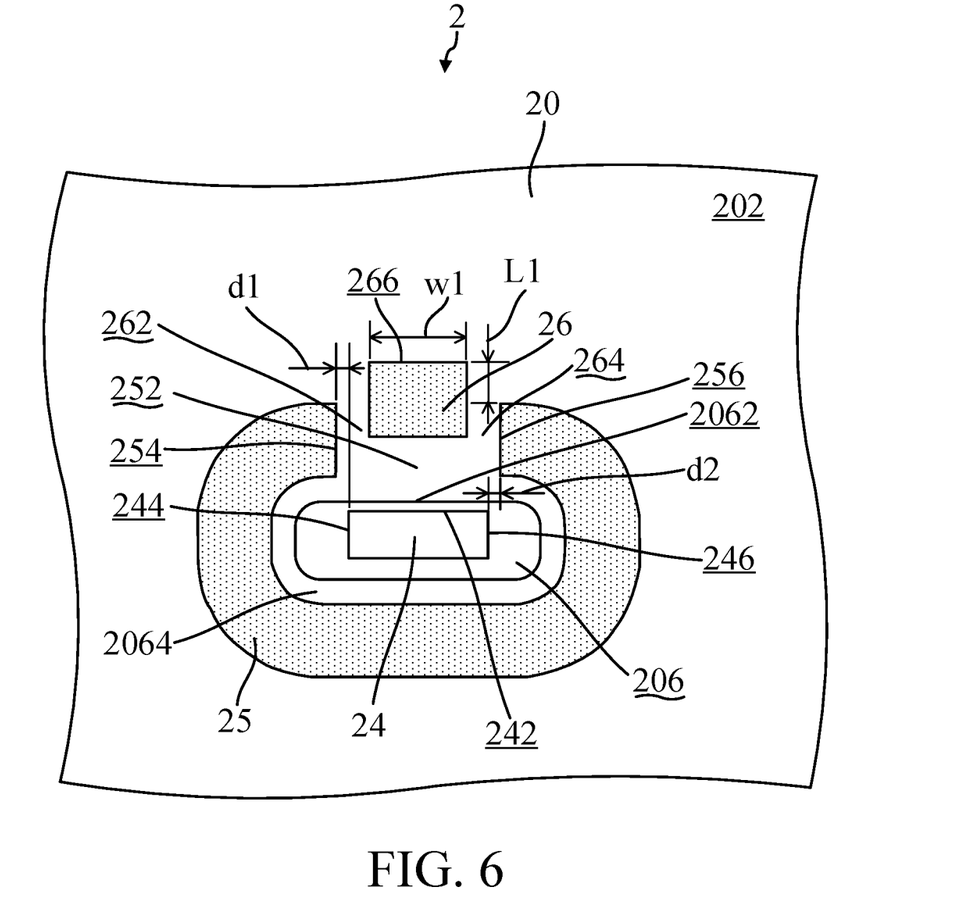
FIG. 6 is a partial top view of the backlight apparatus according to the preferred embodiment of the invention with the uppermost light-shielding membrane removed.
Figure 7:
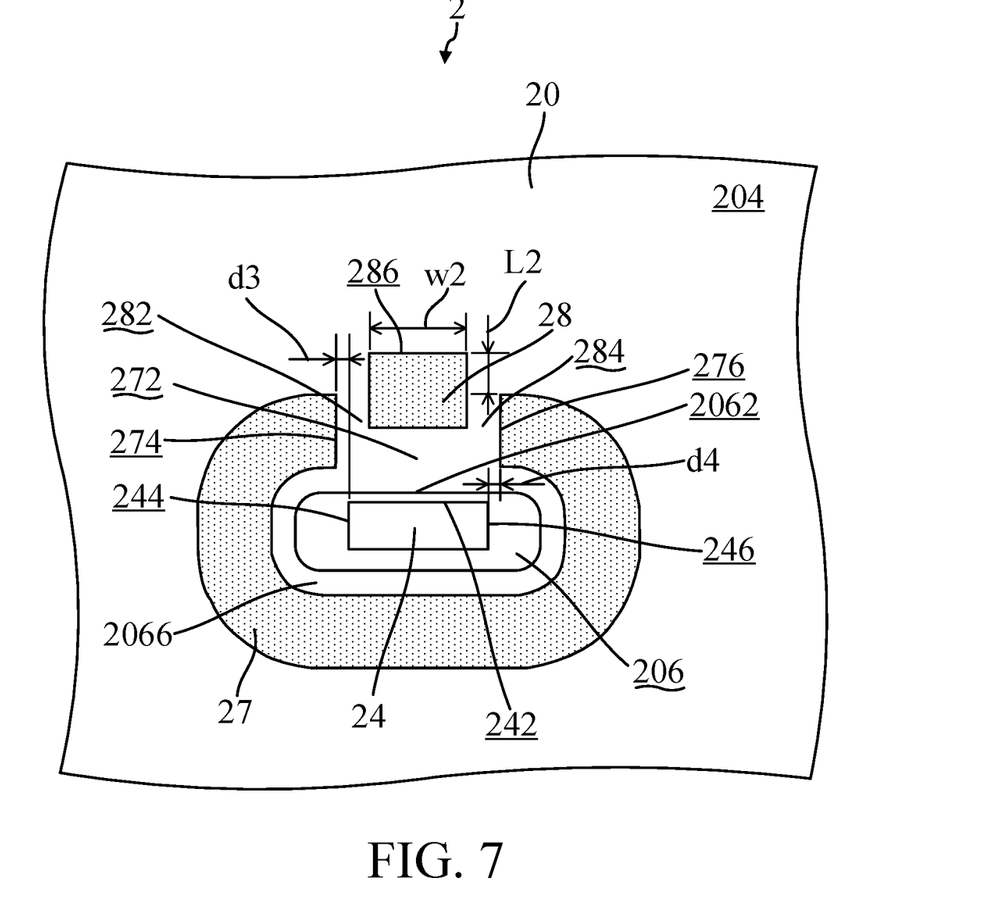
FIG. 7 is a partial bottom view of the backlight apparatus according to the preferred embodiment of the invention with the lowermost circuit board and the light-reflecting sheet removed.

Referring to FIG. 4, FIG. 5, FIG. 6 and FIG. 7, FIG. 4 is a top view of a backlight apparatus 2 used in an illuminated keyboard 3 according to the preferred embodiment of the invention. FIG. 5 is a partial cross-sectional view of the backlight apparatus 2 in FIG. 4 along the line B-B. FIG. 6 is a partial top view of the backlight apparatus 2 according to the invention with the uppermost light-shielding membrane 21 removed. FIG. 7 is a partial bottom view of the backlight apparatus 2 according to the invention with the lowermost circuit board 23 and the light-reflecting sheet 22 removed. In FIG. 5, a partial cross-sectional view of the illuminated keyboard 3 is also shown. The architecture of the illuminated keyboard 3 is well known. As shown in FIG. 5, the illuminated keyboard 3 includes the backlight apparatus 2 of the invention and a plurality of illuminated key switches 32. In FIG. 5, only one key switch is illustrated as a representative.

As shown in FIG. 4, FIG. 5, FIG. 6 and FIG. 7, the backlight apparatus 2 according to the invention includes a light-guiding plate 20, the light-shielding membrane 21, the light-reflecting sheet 22, the circuit board 23, a plurality of light-emitting devices 24, and a plurality of first translucent glue bodies 25.

The light-guiding plate 20 has a front surface 202, a back surface 204 and a plurality of first through holes 206. Each first through hole 206 has a respective light entrance face 2062. The light-shielding membrane 21 has a plurality of light-transmitting parts 212 thereon. The light-shielding membrane 21 is disposed on the front surface 202 of the light-guiding plate 20. The plurality of light-transmitting parts 212 can be, but not limited to, hollow structures.

In FIG. 4, the plurality of first through holes 206 are substantially arranged, but it is not limited to, along the center line perpendicular to the long side of the light-guiding plate 20. The plurality of first through holes 206 may also be arranged along the long side or the short side of the light-guiding plate 20. The plurality of first through holes 206 may also be close to the long side of the light-guiding plate 20 and arranged in an arc or an inverted U shape.

In one embodiment, the light-guiding plate 20 can be made of acrylic, silicone, thermoplastic polyurethane (TPU) or other commercial light-guiding polymer materials. The thickness of the light-guiding plate 20 can be determined as required, and is not particularly limited. For example, in an example, the thickness of the light-guiding plate 20 ranges from about 0.125 mm to 0.25 mm.

The light-reflecting sheet 22 has a plurality of second through holes 222 and a lower surface. Each second through hole 222 corresponds to one of the first through holes 206. The light-reflecting sheet 22 is on the back surface 204 of the light-guiding plate 20 such that each second through hole 222 is aligned with the corresponding first through hole 206.

The plurality of light-emitting devices 24 are electrically bonded on the circuit board 23. Each light-emitting device 24 has a light-emitting side face 242, and corresponds to one of the first through holes 206 and one of the second through holes 222. The circuit board 23 is disposed on the lower surface 220 of the light-reflecting sheet 22 such that each light-emitting device 24 is placed in the corresponding second through hole 222 and the corresponding first through hole 206, and that the light-emitting side face 242 of each light-emitting device 24 faces the light entrance face 2062 of the corresponding first through hole 206. In FIG. 4, the circuit board 23, the plurality of light-emitting devices 24, and the plurality of first through holes 206 of the light-guiding plate 20 under the light-shielding membrane 21 are drawn with dashed lines to show the positional relationship among one another.

In one embodiment, the circuit board 23 can be, but not limited to, a flexible circuit board.

In one embodiment, the light-emitting devices 24 can be, but not limited to, light-emitting diodes or organic light-emitting diodes.

As shown in FIG. 5 and FIG. 6, in particular, each of the first translucent glue bodies 25 corresponds to one of the first through holes 206. Each first translucent glue body 25 is placed on the front surface 202 of the light-guiding plate 20 and surrounds a respective first circumference 2064 of the corresponding first through hole 206 to bond the light-shielding membrane 21 thereabove and the light-guiding plate 20 therebelow. Each first translucent glue body 25 has a respective first breach 252.

Each light-emitting device 24 emits a light from the light-emitting side face 242 thereof toward the corresponding first translucent glue body 25, the corresponding first breach 252, and the light entrance face 2062 of the corresponding first through hole 206, and further enters the light-guiding plate 20. The light is guided by the light-guiding plate 20, and exits from the plurality of light-transmitting parts 212 of the light-shielding membrane 21. The light-reflecting sheet 22 is used for reflecting the light directed to the light-reflecting sheet 22.

Also as shown in FIG. 5 and FIG. 6, further, the backlight apparatus 2 according to the invention also includes a plurality of second translucent glue bodies 26. Each of the second translucent glue bodies 26 corresponding to one of the first translucent glue bodies 25. In particular, each second translucent glue body 26 is placed via at least one portion thereof in the first breach 252 of the corresponding first translucent glue body 25, and bonds the light-shielding membrane 21 thereabove and the light-guiding plate 20 therebelow. Each second translucent glue body 26 and the corresponding first translucent glue body 25 form a respective first slit 262 and a respective second slit 264. Each light-emitting device 24 emits the light from the light-emitting side face 242 thereof also toward the corresponding second translucent glue body 26, the corresponding first slit 262 and the corresponding second slit 264.

As shown in FIG. 5 and FIG. 7, further, the backlight apparatus 2 according to the invention also includes a plurality of third translucent glue bodies 27 and a plurality of fourth translucent glue bodies 28. Each of the third translucent glue bodies 27 corresponds to one of the first through hole 206. Each third translucent glue body 27 is placed on the back surface 204 of the light-guiding plate 20 and surrounds a respective second circumference 2066 of the corresponding first through hole 206 to bond the light-guiding plate 20 thereabove and the light-reflecting sheet 22 therebelow. Each third translucent glue body 27 has a respective second breach 272. Each of the fourth translucent glue bodies 28 corresponds to one of the third translucent glue bodies 27. Each fourth translucent glue body 28 is placed via at least one portion thereof in the second breach 272 of the corresponding third translucent glue body 27. Moreover, each fourth translucent glue body 28 bonds the light-guiding plate 20 thereabove and the light-reflecting sheet 22 therebelow. Each fourth translucent glue body 28 and the corresponding third translucent glue body 27 form a respective third slit 282 and a respective fourth slit 284. Each light-emitting device 24 emits the light from the light-emitting side face 242 thereof also toward the corresponding third translucent glue body 27, the corresponding fourth translucent glue body 28, the corresponding third slit 282 and the corresponding fourth slit 284.

By each first translucent glue body 25 surrounding the first circumference 2064 of the corresponding first through hole 206, and by each third translucent glue body 27 surrounding the second circumference 2066 of the corresponding first through hole 206, the backlight apparatus 2 according to the invention does not cause light leakage of light-emitting devices 24 thereof. Moreover, by the first slit 262 and the second slit 264 formed by each second translucent glue body 26 and the corresponding first translucent glue body 25, and by the third slit 282 and the fourth slit 284 formed by each fourth translucent glue body 28 and the corresponding third translucent glue body 27, the backlight apparatus 2 according to the invention has the advantage of low light attenuation.

In one embodiment, also as shown in FIG. 6, the each light-emitting device 24 also has a respective first side edge 244 and a respective second side edge 246 adjacent to the light-emitting side face 242. Each first translucent glue body 25 also has a respective first breach edge 254 and a respective second breach edge 256. The first breach edge 254 of each first translucent glue body 25 corresponds the first side edge 244 of the corresponding light-emitting device 24. The second breach edge 256 of each first translucent glue body 25 corresponds to the second side edge 246 of the corresponding light-emitting device 24. A first perpendicular distance d1 between the first side edge 244 of each light-emitting device 24 and the corresponding first breach edge 254 ranges from 0.15 mm to 0.25 mm. A second perpendicular distance d2 between the second side edge 246 of each light-emitting device 24 and the corresponding second breach edge 256 ranges from 0.15 mm to 0.25 mm.

In one embodiment, also as shown in FIG. 6, each second translucent glue body 26 has a respective first face 266 away from the corresponding light-emitting device 24. A first width w1 of the first face 266 of each second translucent glue body 26 ranges from 1.5 mm to 2.5 mm.

In one embodiment, a respective first top surface of each second translucent glue body 26 can exhibit a rectangle, a triangle, a trapezoid, a polygon with more than four sides, a circle, an ellipse, etc.

In one embodiment, also as shown in FIG. 6, a first protruding distance L1 of the first face 266 of each second translucent glue body 26 beyond the corresponding first breach 252 ranges from 0.5 mm to 1.5 mm.

In one embodiment, also as shown in FIG. 7, each third translucent glue body 27 also has a respective third breach edge 274 and a respective fourth breach edge 276. The third breach edge 274 of each third translucent glue body 27 corresponds the first side edge 244 of the corresponding light-emitting device 24. The fourth breach edge 276 of each third translucent glue body 27 corresponds to the second side edge 246 of the corresponding light-emitting device 24. A third perpendicular distance d3 between the first side edge 244 of each light-emitting device 24 and the corresponding third breach edge 274 ranges from 0.15 mm to 0.25 mm. A fourth perpendicular distance d4 between the second side edge 246 of each light-emitting device 24 and the corresponding fourth breach edge 276 ranges from 0.15 mm to 0.25 mm.

In one embodiment, also as shown in FIG. 7, each fourth translucent glue body 28 has a respective second face 286 away from the corresponding light-emitting device 24. A second width w2 of the second face 286 of each fourth translucent glue body 28 ranges from 1.5 mm to 2.5 mm.

In one embodiment, a respective second top surface of each fourth translucent glue body 28 can exhibit a rectangle, a triangle, a trapezoid, a polygon with more than four sides, a circle, an ellipse, etc.

In one embodiment, also as shown in FIG. 7, a second protruding distance L2 of the second face 286 of each fourth translucent glue body 28 beyond the corresponding second breach 272 ranges from 0.5 mm to 1.5 mm.

With the detailed description of the above preferred embodiments of the invention, it is clear to understand that the backlight apparatus used in illuminated keyboard according to the invention uses the first translucent glue bodies and the second translucent glue bodies to bond the light-shielding membrane and the light-guiding plate, and uses the third translucent glue bodies and the fourth translucent glue bodies to bond the light-guiding plate and the light-reflecting sheet. Moreover, according to the backlight apparatus of the invention, the first translucent glue bodies, the second translucent glue bodies, the third translucent glue bodies, and the fourth translucent glue bodies are specially designed in geometry, so that the backlight apparatus according to the invention has the advantages of low light attenuation and no light leakage from the light-emitting devices thereof.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A backlight apparatus used in an illuminated keyboard, comprising: a light-guiding plate, having a front surface, a back surface and a plurality of first through holes, each first through hole having a respective light entrance face;
   a light-shielding membrane, having a plurality of light-transmitting parts thereon, the light-shielding membrane being disposed on the front surface of the light-guiding plate;
   a light-reflecting sheet, having a plurality of second through holes and a lower surface, each second through hole corresponding to one of the first through holes, the light-reflecting sheet being on the back surface of the light-guiding plate such that each second through hole is aligned with the corresponding first through hole;
   a circuit board;
   a plurality of light-emitting devices, electrically bonded on the circuit board, each light-emitting device having a light-emitting side face and corresponding to one of the first through holes and one of the second through holes, wherein the circuit board is disposed on the lower surface of the light-reflecting sheet such that each light-emitting device is placed in the corresponding second through hole and the corresponding first through hole, and that the light-emitting side face of each light-emitting device faces the light entrance face of the corresponding first through hole;
   a plurality of first translucent glue bodies, each of the first translucent glue bodies corresponding to one of the first through holes, each first translucent glue body being placed on the front surface of the light-guiding plate and surrounding a respective first circumference of the corresponding first through hole to bond the light-shielding membrane thereabove and the light-guiding plate therebelow, each first translucent glue body having a respective first breach, wherein each light-emitting device emits a light from the light-emitting side face thereof toward the corresponding first translucent glue body, a corresponding first breach, and the light entrance face of the corresponding first through hole, and further enters the light-guiding plate, the light is guided by the light-guiding plate and exits from the plurality of light-transmitting parts, and the light-reflecting sheet is used for reflecting the light directed to the light-reflecting sheet; and
   a plurality of second translucent glue bodies, each of the second translucent glue bodies corresponding to one of the first translucent glue bodies, each second translucent glue body being placed via at least one portion thereof in the first breach of the corresponding first translucent glue body, and bonding the light-shielding membrane thereabove and the light-guiding plate therebelow, each second translucent glue body and the corresponding first translucent glue body forming a respective first slit and a respective second slit, wherein each light-emitting device emits the light from the light-emitting side face thereof also toward the corresponding second translucent glue body, a corresponding first slit and a corresponding second slit,
   wherein each light-emitting device also has a respective first side edge and a respective second side edge adjacent to the light-emitting side face, each first translucent glue body also has a respective first breach edge and a respective second breach edge, the first breach edge of each first translucent glue body corresponds to the first side edge of the corresponding light-emitting device, the second breach edge of each first translucent glue body corresponds to the second side edge of the corresponding light-emitting device, a first perpendicular distance between the first side edge of each light-emitting device and the corresponding first breach edge ranges from 0.15 mm to 0.25 mm, a second perpendicular distance between the second side edge of each light-emitting device and the corresponding second breach edge ranges from 0.15 mm to 0.25 mm, each second translucent glue body has a respective first face away from the corresponding light-emitting device, and a first width of the first face of each second translucent glue body ranges from 1.5 mm to 2.5 mm.

2. The backlight apparatus of claim 1, wherein a respective first top surface of each second translucent glue body exhibits one selected from a group consisting of a rectangle, a triangle, a trapezoid, a polygon with more than four sides, a circle, and an ellipse.

3. The backlight apparatus of claim 1, wherein a first protruding distance of the first face of each second translucent glue body beyond the corresponding first breach ranges from 0.5 mm to 1.5 mm.

4. A backlight apparatus used in an illuminated keyboard, comprising:
   a light-guiding plate, having a front surface, a back surface and a plurality of first through holes, each first through hole having a respective light entrance face;
   a light-shielding membrane, having a plurality of light-transmitting parts thereon, the light-shielding membrane being disposed on the front surface of the light-guiding plate;
   a light-reflecting sheet, having a plurality of second through holes and a lower surface, each second through hole corresponding to one of the first through holes, the light-reflecting sheet being on the back surface of the light-guiding plate such that each second through hole is aligned with the corresponding first through hole;

a circuit board;

a plurality of light-emitting devices, electrically bonded on the circuit board, each light-emitting device having a light-emitting side face and corresponding to one of the first through holes and one of the second through holes, wherein the circuit board is disposed on the lower surface of the light-reflecting sheet such that each light-emitting device is placed in the corresponding second through hole and the corresponding first through hole, and that the light-emitting side face of each light-emitting device faces the light entrance face of the corresponding first through hole;

a plurality of first translucent glue bodies, each of the first translucent glue bodies corresponding to one of the first through holes, each first translucent glue body being placed on the front surface of the light-guiding plate and surrounding a respective first circumference of the corresponding first through hole to bond the light-shielding membrane thereabove and the light-guiding plate therebelow, each first translucent glue body having a respective first breach, wherein each light-emitting device emits a light from the light-emitting side face thereof toward the corresponding first translucent glue body, a corresponding first breach, and the light entrance face of the corresponding first through hole, and further enters the light-guiding plate, the light is guided by the light-guiding plate and exits from the plurality of light-transmitting parts, and the light-reflecting sheet is used for reflecting the light directed to the light-reflecting sheet; and a plurality of second translucent glue bodies, each of the second translucent glue bodies corresponding to one of the first translucent glue bodies, each second translucent glue body being placed via at least one portion thereof in the first breach of the corresponding first translucent glue body, and bonding the light-shielding membrane thereabove and the light-guiding plate therebelow, each second translucent glue body and the corresponding first translucent glue body forming a respective first slit and a respective second slit, wherein each light-emitting device emits the light from the light-emitting side face thereof also toward the corresponding second translucent glue body, a corresponding first slit and a corresponding second slit, a plurality of third translucent glue bodies, each of the third translucent glue bodies corresponding to one of the first through holes, each third translucent glue body being placed on the back surface of the light-guiding plate and surrounding a respective second circumference of the corresponding first through hole to bond the light-guiding plate thereabove and the light-reflecting sheet therebelow, each third translucent glue body having a respective second breach; and a plurality of fourth translucent glue bodies, each of the fourth translucent glue bodies corresponding to one of the third translucent glue bodies, each fourth translucent glue body being placed via at least one portion thereof in the second breach of the corresponding third translucent glue body, and bonding the light-guiding plate thereabove and the light-reflecting sheet therebelow, each fourth translucent glue body and the corresponding third translucent glue body forming a respective third slit and a respective fourth slit, wherein each light-emitting device emits the light from the light-emitting side face thereof also toward the corresponding third translucent glue body, the corresponding fourth translucent glue body, a corresponding third slit and a corresponding fourth slit, wherein each third translucent glue body also has a respective third breach edge and a respective fourth breach edge, the third breach edge of each third translucent glue body corresponds to a first side edge of the corresponding light-emitting device, the fourth breach edge of each third translucent glue body corresponds to a second side edge of the corresponding light-emitting device, a third perpendicular distance between the first side edge of each light-emitting device and the corresponding third breach edge ranges from 0.15 mm to 0.25 mm, a fourth perpendicular distance between the second side edge of each light-emitting device and the corresponding fourth breach edge ranges from 0.15 mm to 0.25 mm, each fourth translucent glue body has a respective second face away from the corresponding light-emitting device, and a second width of the second face of each fourth translucent glue body ranges from 1.5 mm to 2.5 mm.

5. The backlight apparatus of claim 4, wherein a respective second top surface of each fourth translucent glue body exhibits one selected from a group consisting of a rectangle, a triangle, a trapezoid, a polygon with more than four sides, a circle, and an ellipse.

6. The backlight apparatus of claim 4, wherein a second protruding distance of the second face of each fourth translucent glue body beyond the corresponding second breach ranges from 0.5 mm to 1.5 mm.

* * * * *